(12) United States Patent
Linhoff

(10) Patent No.: US 9,566,969 B2
(45) Date of Patent: Feb. 14, 2017

(54) POWER BRAKE SYSTEM

(71) Applicant: Continental Teves AG & Co. oHG, Frankfurt (DE)

(72) Inventor: Paul Linhoff, Neu-Anspach (DE)

(73) Assignee: Continental Teves AG & Co. oHG, Frankfurt (DE)

(*) Notice: Subject to any disclaimer, the term of this patent is extended or adjusted under 35 U.S.C. 154(b) by 0 days.

(21) Appl. No.: 14/383,947

(22) PCT Filed: Mar. 14, 2013

(86) PCT No.: PCT/EP2013/055191
§ 371 (c)(1),
(2) Date: Sep. 9, 2014

(87) PCT Pub. No.: WO2013/139669
PCT Pub. Date: Sep. 26, 2013

(65) Prior Publication Data
US 2015/0028666 A1    Jan. 29, 2015

(30) Foreign Application Priority Data
Mar. 19, 2012    (DE) .................. 10 2012 204 263

(51) Int. Cl.
*B60T 13/74* (2006.01)
*B60T 7/04* (2006.01)
*B60T 8/40* (2006.01)

(52) U.S. Cl.
CPC .............. *B60T 13/745* (2013.01); *B60T 7/042* (2013.01); *B60T 8/4077* (2013.01)

(58) Field of Classification Search
CPC ........ B60T 7/042; B60T 8/4077; B60T 13/745
(Continued)

(56) References Cited

U.S. PATENT DOCUMENTS 4,784,442 A    11/1988  Petersen
5,836,659 A *  11/1998  Feigel ...................... B60T 8/00
                                                  303/113.4
(Continued)

FOREIGN PATENT DOCUMENTS

DE        3504096      8/1986
DE       19853036      6/1999
(Continued)

OTHER PUBLICATIONS

International Search Report for PCT/EP2013/055191 mailed Jun. 18, 2013.
(Continued)

*Primary Examiner* — Thomas J Williams
*Assistant Examiner* — Mariano Sy
(74) *Attorney, Agent, or Firm* — RatnerPrestia

(57) ABSTRACT

The invention relates to a spring-force brake system having a brake operating unit, having at least one sensor for detecting a driver braking demand upon operation of the brake operating unit by the driver, having at least one actuation unit for setting and regulating a braking force. For this purpose, it is provided according to the invention that at least one primary electronic control and regulating unit is provided which is connected at the signal input side to at least one sensor and which activates the actuation unit as a function of or on the basis of the signals of the sensor, and that at least one secondary control and regulating unit is provided which is connected at the signal input side to at least one sensor and which activates the actuation unit on demand on the basis of or as a function of signals of the sensor.

11 Claims, 4 Drawing Sheets

(58) Field of Classification Search
USPC .................................. 303/3, 14, 15, 115.2
See application file for complete search history.

(56) References Cited

U.S. PATENT DOCUMENTS

| | | | | |
|---|---|---|---|---|
| 6,007,161 | A * | 12/1999 | Worsdorfer | B60T 7/042 303/115.2 |
| 6,033,036 | A * | 3/2000 | Ruffer | B60T 7/042 188/358 |
| 6,315,370 | B1 * | 11/2001 | Feigel | B60T 7/042 303/113.4 |
| 6,317,675 | B1 * | 11/2001 | Stolzl | B60T 7/042 303/155 |
| 6,390,565 | B2 * | 5/2002 | Riddiford | 303/113.4 |
| 6,410,993 | B1 * | 6/2002 | Giers | B60G 17/0185 303/20 |
| 6,607,251 | B2 * | 8/2003 | Baumgartner | B60T 7/042 303/122.05 |
| 8,226,176 | B2 * | 7/2012 | Hatano | B60T 8/4081 303/115.2 |
| 8,342,615 | B2 * | 1/2013 | Drumm | B60T 8/4077 188/152 |
| 2001/0035679 | A1 * | 11/2001 | Riddiford | B60T 7/042 303/155 |
| 2008/0223675 | A1 | 9/2008 | Hatano | |
| 2012/0169112 | A1 * | 7/2012 | Jungbecker | B60T 8/4081 303/9.75 |
| 2012/0330501 | A1 * | 12/2012 | Sundaram | G05B 23/0248 701/33.9 |
| 2014/0225425 | A1 * | 8/2014 | Drumm | B60T 7/042 303/9.75 |

FOREIGN PATENT DOCUMENTS

| | | |
|---|---|---|
| DE | 102006040424 | 3/2008 |
| DE | 102007035326 | 1/2009 |
| DE | 102010040097 | 3/2011 |
| DE | 102011108297 | 8/2012 |
| DE | 102012202645 | 10/2012 |
| EP | 0978435 | 2/2000 |
| EP | 1541437 | 6/2005 |
| JP | 2000052967 | 2/2000 |
| WO | 0162569 | 8/2001 |

OTHER PUBLICATIONS

German Search Report mailed Dec. 19, 2012 in counterpart German Application No. 10 2012 204 263.6, including partial translation.
Written Opinion of the International Searching Authority for International Application No. PCT/EP2013/055191.

* cited by examiner

POWER BRAKE SYSTEM

CROSS REFERENCE TO RELATED APPLICATIONS

This application is the U.S. National Phase Application of PCT International Application No. PCT/EP2013/055191, filed Mar. 14, 2013, which claims priority to German Patent Application No. 10 2012 204 263.6, filed Mar. 19, 2012, the contents of such applications being incorporated by reference herein.

FIELD OF THE INVENTION

The invention relates to a power brake system with a brake operating unit, with at least one sensor for detecting a driver's braking demand when the brake operating unit is operated by the driver, and with at least one actuating unit for setting and adjusting a brake force.

BACKGROUND OF THE INVENTION

The development of power brake systems makes it possible to offer handling of the brake system that is safe and convenient for the driver. In the case of these brake systems, the driver does not build up the pressure in the brake circuits or wheel brakes directly by his physical strength. Instead, his braking demand is usually introduced into a simulator unit with a brake pedal and this demand is correspondingly detected by sensors. It is used for calculating a setpoint brake torque in an electronic control and regulating unit, the control and regulating unit then activating the actuating unit on the basis of manipulated variables corresponding to the setpoint brake torque for building up brake pressure. The actuating unit in this case comprises for example an electric motor, which operates a tandem brake master cylinder, to the chambers of which the brake circuits are hydraulically connected.

Known solutions of hydraulic power brake systems with central control have an energy supply, a (safe) central electronic control and a drive, which is responsible for the brake-pressure build-up. Some configurations of such brake systems have a hydraulic energy accumulator (high-pressure accumulator). However, such types of construction have proven to be inefficient in terms of energy, so that so-called power on demand functionalities are preferably used. In such a case, the dependence of the corresponding components on the electrical energy supply or the electrical system of the vehicle has to be accepted.

In order to meet the requirements of ECE 13, such brake systems must have a hydraulic-mechanical fallback level, where the driver can brake the vehicle with a deceleration of at least 0.3 g by physical strength in the event of failure of the primary functions of the brake system. However, a disadvantage of this is that in particular cases there is only limited effectiveness of this fallback level for the vehicle user. When the fallback level comes into effect, the driver often has the perception that there is a total failure of the brakes, since the feel of the pedal and the exertion of force necessary for braking as well as the maximum deceleration differ significantly from those in normal operation of the brake system. There is therefore usually a very great difference between the full function and the fallback level of the brake system in respect of brake-pedal force/travel and deceleration. In addition to this there is a relatively great probability of activation of the fallback level during normal vehicle operation being caused by the required electrical/electronic components, in particular in comparison with systems with normal braking function that are based on purely hydraulic/mechanical components, such as for example systems with a vacuum booster. For the driver who has become accustomed to the normal function of the brake system and has developed corresponding automatic responses, there is the risk that, in a situation where there is a failure of the normal function of the brake system, he cannot adapt himself quickly enough, so that an extremely hazardous situation may arise for the driver and his vicinity.

SUMMARY OF THE INVENTION

An aspect of the invention provided a brake system of the aforementioned type in which, by having an intermediate fallback level, the necessity for activation of the mechanical-hydraulic fallback level when faults occur is significantly reduced, or, depending on the setup, could be eliminated entirely.

This is achieved according to an aspect of the invention by providing at least one primary electronic control and regulating unit, which is connected on the signal input side to at least one sensor and activates the actuating unit in dependence on or on the basis of signals of said sensor, and by providing at least one secondary control and regulating unit, which is connected on the signal input side to at least one sensor and activates the operating unit on demand on the basis of or in dependence on the signals of said sensor.

An aspect of the invention is based on the idea that, in the case of conventional power brake systems, the great difference between the normal operating mode and the hydraulic fallback level can lead to the driver stopping from treading firmly on the brake pedal, so that in such a situation the braking distance becomes much too long and, as a result, there is a great potential for danger. For this reason, the activation of this fallback level should be averted as far as possible if a fault occurring can be dealt with or headed off in some other way.

As has been recognized now, this can be realized by introducing an intermediate level or additional fallback level where the occurrence of localized faults can be dealt with without having to rely on the mechanical-hydraulic fallback level. This additional level should as far as possible have for this purpose a range of functions similar to the normal level or normal operating mode and, as far as possible, also be able to rely on the corresponding components. In particular, faults or a failure of the electronic control and regulating unit (ECU) should be headed off.

Such an intermediate level is realized by the provision of two independent control and regulating units, which are respectively connected on the signal input side to at least one sensor for detecting a driver's braking demand, wherein, in the event of a fault of the control and regulating unit already present, the activation of the actuating unit can be performed by the respectively other control and regulating unit. This should as a minimum function perform at least the basic function of the normal braking function (without traction control, ABS, etc.).

The respective control and regulating unit advantageously has a separate energy supply that is independent of the energy supply of the respectively other control and regulating units. In this way, not only malfunctions or failures of the functional capability of the respective control and regulating unit but also total failure caused by the failure of the power supply can be compensated at the fallback level now provided. As long as the other control and regulating unit can still be supplied with energy, it can still take over the activation of the actuating unit. In this way, although, depending on the design of the further control and regulating unit, the functional variety is possibly limited (for example no traction control measures may take place any longer), the basic functions of the power-controlled brake system can still be retrieved. Moreover, the driver does not suddenly experience a very different relationship between the pedal travel and the deceleration torque, as is usually the case when switching over to the mechanical-hydraulic fallback level.

Advantageously, the primary control and regulating unit and the at least one secondary control and regulating unit are configured in compliance with a prescribed safety requirement, in particular ASIL D, in such a way that they together meet the prescribed safety requirement, each of the control and regulating units in itself conforming to a low safety requirement, in particular ASIL B. This means that it is not necessary to use two identically configured control and regulating units, but they can instead be reduced in comparison with a fully capable control and regulating unit in respect of the range of functions and installation space, power consumption and costs. The primary and secondary control and regulating units may be accommodated in a common housing or else be realized in separate subassemblies. In this connection, the terms "primary" and "secondary" do not necessarily mean that one of the control and regulating units must have a greater range of functions than the other. It is also possible for all the necessary control and regulating functions to be essentially shared by the two control and regulating units. As an alternative to this, for example, the secondary unit is equipped only with the basic functions, while the other (primary) unit has the regulating functionality (ABS, traction control, etc.).

In a preferred embodiment there is provided an actuating unit, which comprises an electric motor, and an actuator, in particular comprising a gear mechanism and a spindle unit, which transforms a rotary movement of the motor spindle into a translatory movement of a primary piston of a tandem brake master cylinder (TBMC), the tandem brake master cylinder having two chambers, and each chamber being hydraulically connected to a brake circuit with two wheel brakes.

The electric motor, in particular an electronically commutating BLDC (brushless direct current) motor, is in this case preferably of a two-part configuration with two components, each of the two components being respectively activated by one of the control and regulating units. In this case, each of the two parts preferably comprises a corresponding set of three coils of the stator. If both sets of coils are activated by both control and regulating units, the motor delivers the full power. At the intermediate fallback level, in the case of which only one of the two control and regulating units or parts activates the corresponding coils, the power of the motor is then indeed reduced, but the power mode of operation can nevertheless still be used for braking the vehicle and bringing it to a standstill.

In a further preferred embodiment, an additional actuating unit, which can be activated by the further control and regulating unit (ECU 2), is provided. That is to say that, apart from two independent control and regulating units, there are also two independent actuating units, which can respectively be activated by one and/or both control and regulating units. In this way, even in the event of failure of one actuating unit, the power functionality of the brake system can be maintained.

Preferably, a secondary control and regulating unit and an additional actuating unit respectively have together a separate energy supply that is independent of the energy supply of the respectively other control and regulating units and actuating units. Advantageously, these actuating units respectively comprise an electric motor and an actuator, in particular comprising a gear mechanism and a spindle unit, which transforms a rotary movement of the motor spindle into a translatory movement of a piston in a chamber of a brake master cylinder, the respective chamber being hydraulically connected to a brake circuit with two wheel brakes. If one actuating unit fails, power braking can at least still be performed in the brake circuit that is assigned to the intact actuating unit, by way of the operation of the corresponding brake master cylinder.

In an alternative design of the power brake system, the respective actuating unit comprises a number of electric motors, which respectively operate an electromechanical brake by way of an actuator.

For detecting a driver's braking demand, a travel sensor of a redundant configuration is advantageously provided. Alternatively or in combination with that, a pressure sensor of a redundant configuration is advantageously provided for the detection of a driver's braking demand.

The detection of a driver's braking demand is also advantageously carried out with the aid of an operating unit, which comprises a brake pedal and a simulator. A travel sensor allows the travel completed by the brake pedal to be sensed. A pressure sensor is suitable for hydraulic simulators, in which, when the brake pedal is operated, the driver displaces pressure medium in a cylinder by way of a piston. The advantages of the invention are in particular that the reliability of the brake system or the ability to control the vehicle in the event of possible faults is improved by the provision of an intermediate fallback level with an additional control and regulating unit. The redundant configuration of the components that are decisive for the normal operating mode of the power brake system allows a sufficient performance of the first fallback level of the brake system to be ensured in the decisive cases of faults occurring.

Thus, a further or additional control and regulating unit that can activate the actuating unit on demand still allows power braking to be performed even when the primary control and regulating unit has failed. If an additional actuating unit is also provided, malfunctions or failures in one of the actuating units can also be headed off and the mechanical/hydraulic fallback level need not be activated. The probability of having to rely on the mechanical-hydraulic fallback level is therefore reduced significantly in comparison with conventional brake systems.

BRIEF DESCRIPTION OF THE DRAWINGS

An exemplary embodiment of the invention is explained in more detail on the basis of a drawing, in which, in a highly schematized form of representation.

The same parts are provided with the same designations in all of the figures.

DETAILED DESCRIPTION OF THE PREFERRED EMBODIMENTS

Figure 1:
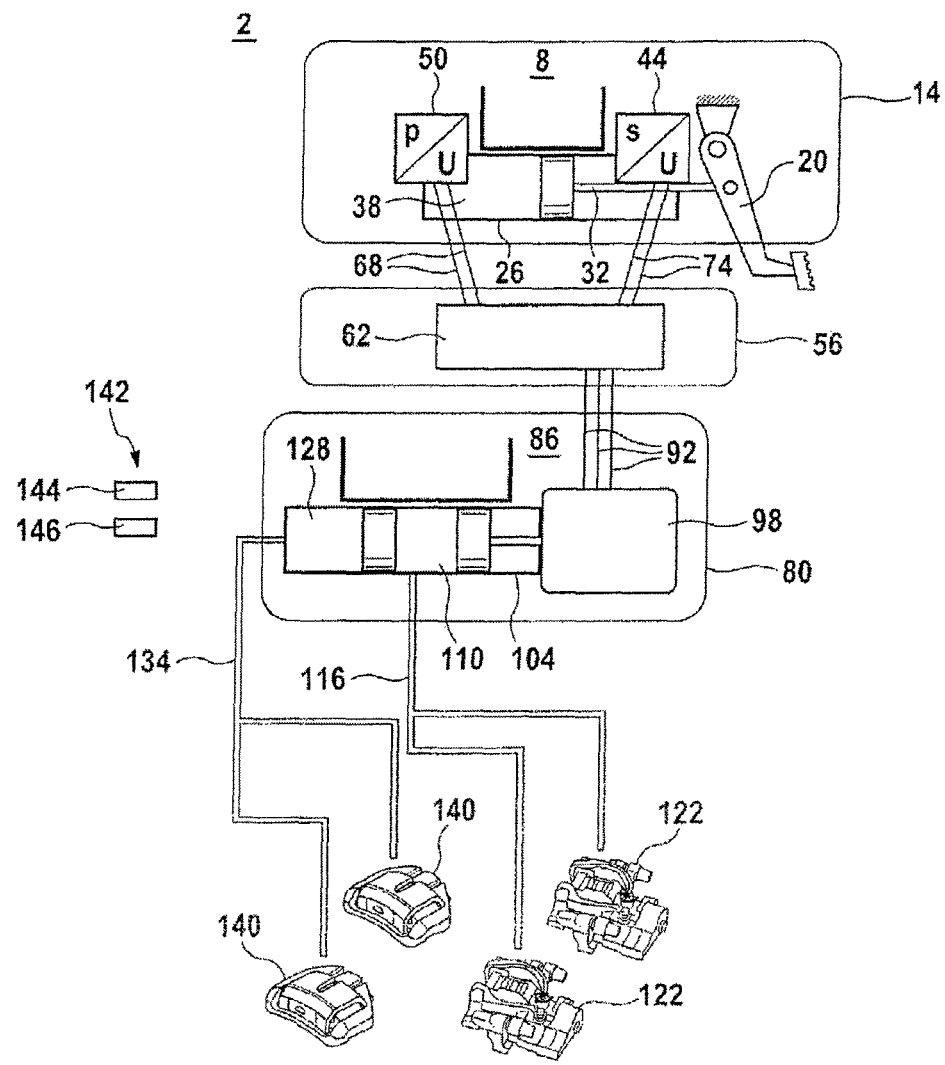
FIG. 1 shows a power brake system according to the prior art with a brake operating unit, a central electronic control and regulating unit and an actuating unit and also two brake circuits, to which two wheel brakes are respectively hydraulically connected.

The power brake system 2 from FIG. 1 according to the prior art comprises an operating unit 8, the components of which are represented in the box 14. The operating unit 8 has a brake pedal 20, which, when operated in a simulator 26, displaces a simulator piston 32 into a pressure chamber 38 filled with pressure medium. The operating unit comprises a travel sensor 44 of a redundant configuration, which for example measures the travel completed by the pedal or the simulator piston 32, and a pressure sensor 50 of a redundant configuration. Instead of a travel sensor 44, an angle sensor or force sensor may also be used for example. The pressure sensor 50 measures the pressure present in the pressure chamber 38. The aforementioned components serve for signal acquisition for detecting a driver's braking demand and conform overall to the safety requirement ASIL D.

The power brake system 2 also comprises a (central) single electronic control and regulating unit (ECU) 62, which is represented in the box 56 and is connected on the signal input side by way of signal lines 68 to the pressure sensor 50 and by way of signal lines 74 to the travel sensor 44. The control and regulating unit 62 comprises a processor and power electronics for detecting a driver's braking demand and regulating the manipulated variables necessary for setting and regulating the desired brake pressure. The control and regulating unit is for this purpose designed in such a way that it conforms to the safety requirements ASIL D.

For setting the manipulated variables, the control and regulating unit 62 is connected on the signal input side and signal output side by way of signal lines 92 to an actuating unit 86 that is represented in the box 80. This actuating unit comprises an electric motor with a motor spindle (not represented), a gear mechanism and a spindle unit (each not represented) and a tandem brake master cylinder 104. The first chamber 110 of said cylinder is hydraulically connected to a first brake circuit 116, which comprises two rear wheel brakes 122. A second chamber 128 is hydraulically connected to a second brake circuit 134, which comprises two front wheel brakes 140.

During the operation of the brake system, when the brake pedal 20 is operated by the driver, the signals of the sensors 44, 50 are processed by the ECU, in order to determine the driver's braking demand and calculate from it a setpoint brake torque, with the aid of which the manipulated variables for the actuating unit 86 are then determined and passed on to the actuating unit 86 by way of the signal lines 92. Here, as in the following figures, the power brake system 2 is shown in black and white in respect of the brake circuits 116, 134, the secondary or floating chamber 128 being assigned the front wheel brakes 140. Alternatively, the chamber 128 may also be assigned the rear wheel brakes or there may be a diagonal split.

Figure 2:
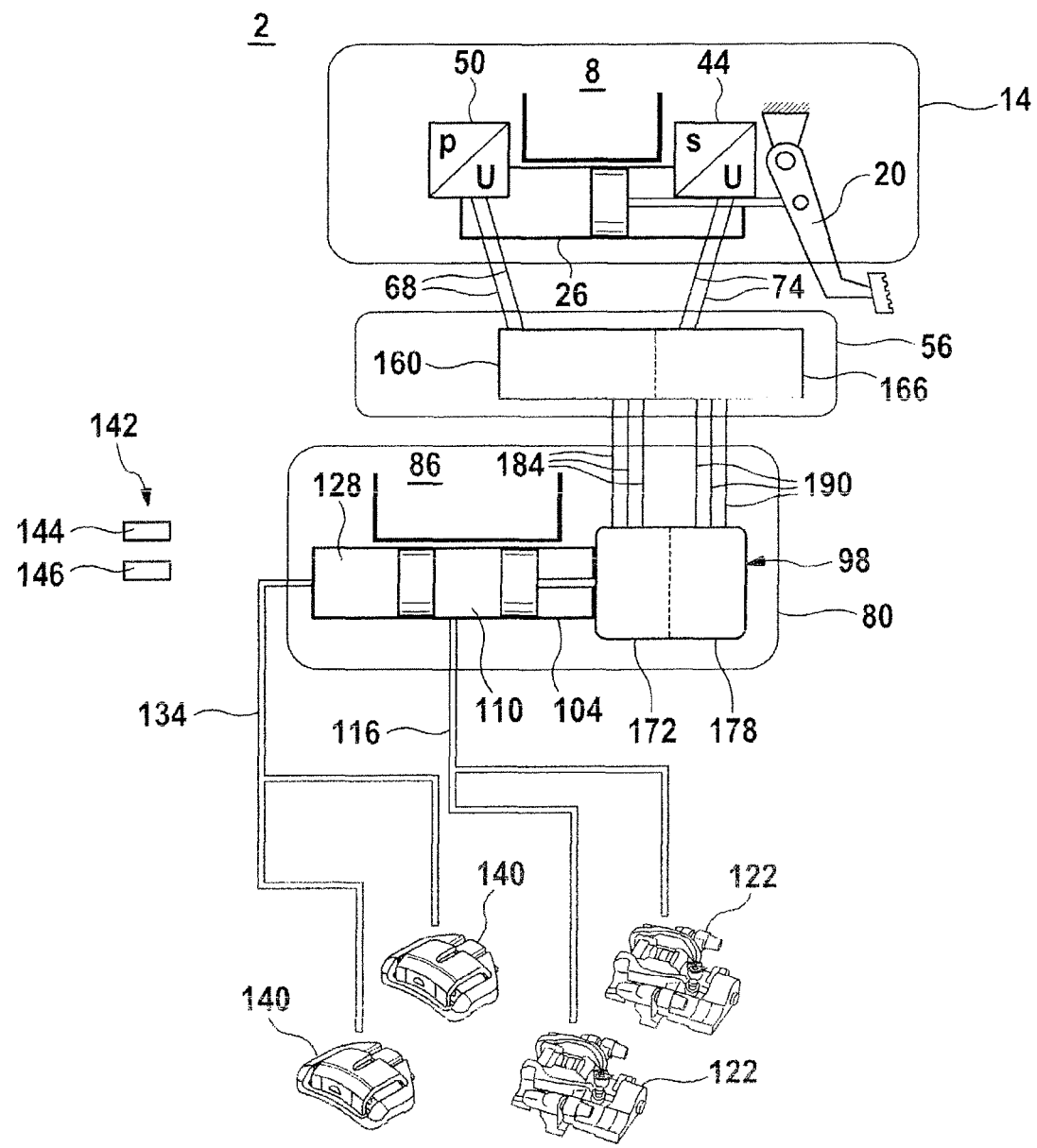
FIG. 2 shows a power brake system in a first preferred embodiment, with a primary control and regulating unit and a secondary control and regulating unit.

A first exemplary embodiment of a brake system according to the invention is represented in FIG. 2. By contrast with the power brake system known from the prior art from FIG. 1, two control and regulating units 160, 166 are provided, to be specific a primary control and regulating unit 160 (ECU) and a secondary control and regulating unit 166 (ECU 2), each of the two control and regulating units 160, 166 respectively comprising a processor and power electronics for detecting a driver's braking demand. The ECU is connected by way of signal lines 68 to the pressure sensor 50, the ECU 2 is connected by way of signal lines 74 to the travel sensor 44. The assignment may also be chosen the other way round, and both control and regulating units 160, 166 may also be connected on the signal input side to both sensors 44, 50. There may also be more than one secondary control and regulating unit 166 provided, the total of all the ECUs then respectively meeting a prescribed safety requirement.

The electric motor 98 is of a two-part configuration, with a first part 172, which can be activated by the control and regulating unit 160 by way of signal lines 184, and a second part 178, which can be activated by the control and regulating unit 166 by way of signal lines 190. Both parts of the motor or part-components 172, 178 operate the tandem brake master cylinder 104 by way of a gear-mechanism/spindle unit (not represented) for building up brake pressure in the brake circuits 116, 134. While the control and regulating unit 160 has the full range of performance of control and regulating operations, the further control and regulating unit 166 can only perform basic functions without regulating operations such as traction control. In the present exemplary embodiment, the electric motor 98 is formed as a dual star-connected three-phase BLDC motor, the stator comprising 6 coils instead of 3 coils and three of the coils being respectively activated by one control and regulating unit 160, 166, whereby a particularly simple and low-cost connection is obtained. When all 6 coils are activated, the electric motor delivers the full power.

A power supply 142 by an electrical system of the vehicle, possibly also with a generator, is schematically depicted by a positive terminal 144 and electrical ground 146.

By means of the specially designed redundant configuration of the control and regulating unit 160, 166 and the two-part configuration of the electric motor 98, the power brake system according to FIG. 2 realizes an intermediate fallback level where the power functionality is still retained, at least in its basic functions. In the event of failure of one of the control and regulating units 160, 166, the other unit respectively can still activate the actuating unit 86 and build up brake pressure in a specifically power-operated manner. It is therefore not necessary in these cases to switch directly to the hydraulic fallback level, where the driver has a very different perception of the relationship between the pedal travel and the deceleration torque and must also expend significantly more force for braking.

Figure 3:
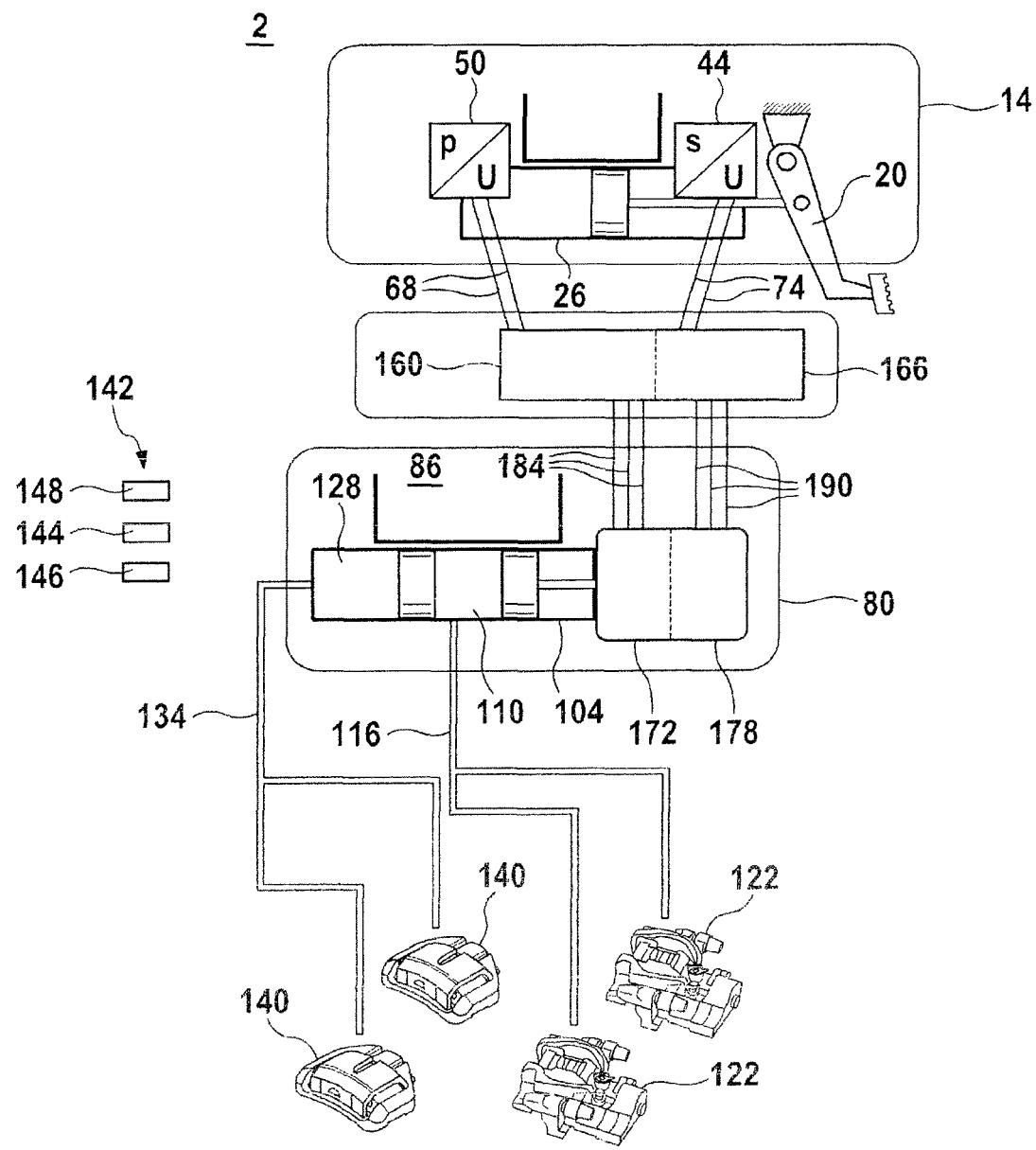
FIG. 3 shows the power brake system from FIG. 2 in a preferred development, each of the two control and regulating units having an energy supply of its own.

The power brake system 2 represented in FIG. 3 differs from that shown in FIG. 2 by the design of the power supply 142. This now has two positive terminals 144, 148. The power supply 142 is consequently of a 2-circuit configuration, in the sense that each of the two control and regulating units 160, 166 has a separate power supply, so that, in the event of failure of one of the power supplies, at least one control and regulating unit can still activate the actuating unit 86.

Figure 4:
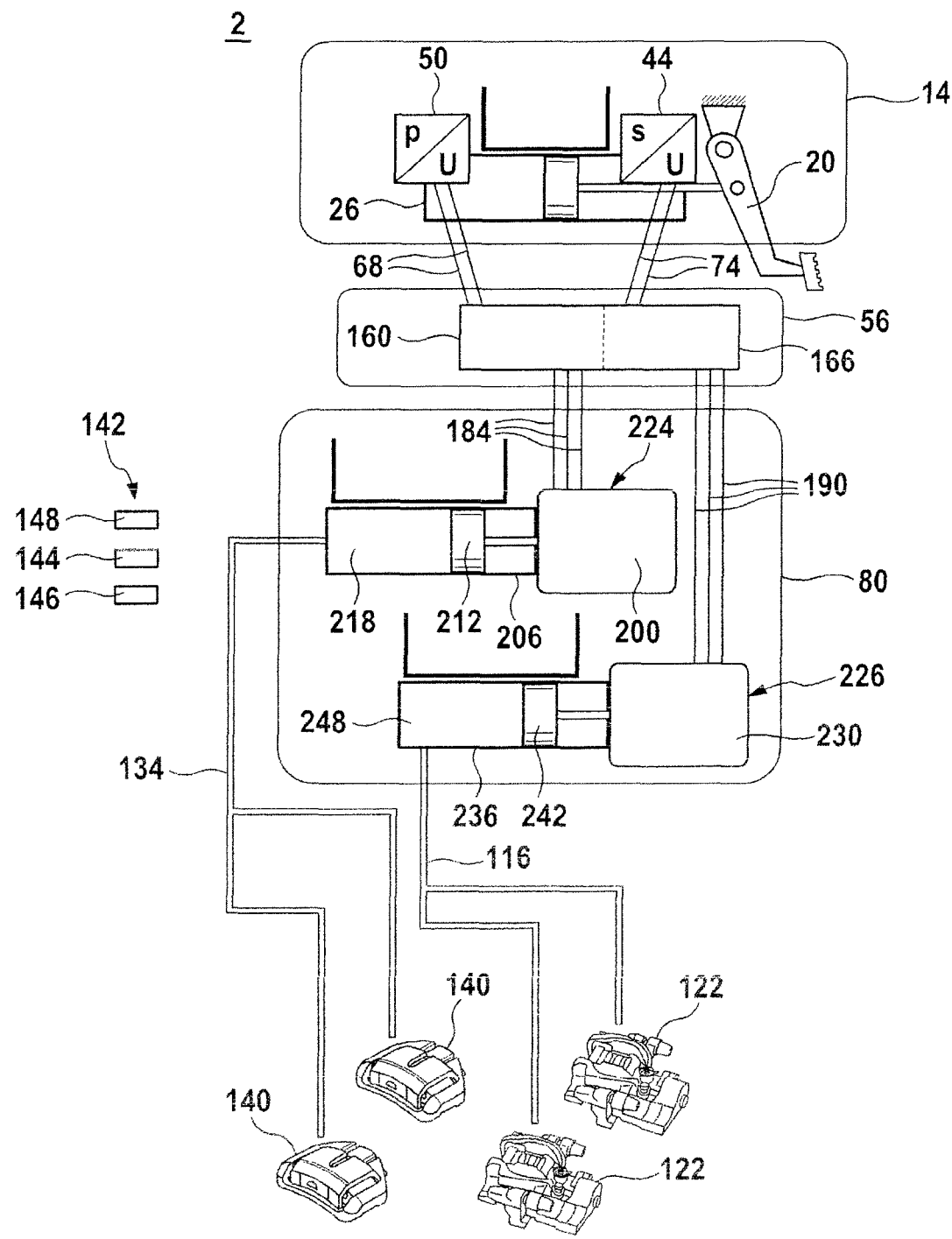
FIG. 4 shows a power brake system with an additional actuating unit.

FIG. 4 shows a power brake system 2 in a further preferred embodiment. As in the case of the configuration in FIG. 2, two control and regulating units 160, 166 are provided. In addition, however, now two independent actuating units 224, 226 are also provided. The actuating unit 224 comprises an electric motor 200, which by way of a gear-mechanism/spindle unit displaces a piston 212 in a brake master cylinder 206 for building up pressure in a chamber 218 and the brake circuit 134 connected thereto. The actuating unit 226 equivalently comprises an electric motor 230, which displaces a piston 242 in a brake master cylinder 236 for building up pressure in a chamber 248 and the brake circuit 116. By way of signal lines 184, the control and regulating unit 160 activates the actuating unit 224; by way of signal lines 190, the control and regulating unit 166 activates the actuating unit 226, in both cases respectively the corresponding electric motor 200, 230 in particular. In the case of this configuration of the power brake system 2, therefore, each of the two control and regulating units is assigned an actuating unit 224, 226.

Here, too, a two-circuit energy or power supply 142 is again realized. In this case, the control and regulating unit 160 and the actuating unit 224 are assigned to one energy supply circuit and the control and regulating unit 166 and the actuating unit 226 are assigned to another energy supply circuit. Thus, if one control and regulating unit 160, 166 fails, the actuating unit 224, 226 that is assigned or connected in signaling terms to it can no longer be activated, as a result of which the corresponding brake circuit 134, 116 correspondingly fails. However, the respectively other brake circuit 116, 134, to which the still functioning and active control and regulating unit 166, 160 is assigned, can therefore still be actuated in the power operating mode.

LIST OF DESIGNATIONS 2 power brake system
8 operating unit
14 box
20 brake pedal
26 simulator
32 simulator piston
38 pressure chamber
44 travel sensor
50 pressure sensor
56 box
62 control and regulating unit
68 signal line
74 signal line
80 box
86 actuating unit
92 signal line
98 electric motor
104 tandem brake master cylinder
110 chamber
116 brake circuit
122 rear wheel brake
128 chamber
134 brake circuit
140 front wheel brake
142 power supply
144 positive terminal
146 ground
148 positive terminal
160 primary control and regulating unit
166 secondary control and regulating unit
172 first part
178 second part
184 signal line
190 signal line
200 electric motor
206 brake master cylinder
212 piston
218 chamber
224 actuating unit
226 actuating unit
230 electric motor
236 brake master cylinder
242 piston
248 chamber

The invention claimed is:

1. A power brake system with a brake operating unit, with at least one sensor for detecting a driver's braking demand when the brake operating unit is operated by the driver, with at least one actuating unit for setting and adjusting a brake force, and with a primary electronic control and regulating unit, which is connected on a signal input side thereof to at least one sensor and activates the at least one actuating unit on demand in dependence on signals of said at least one sensor, and with at least one secondary control and regulating unit, which is connected on a signal input side thereof to at least one sensor and activates the at least one actuating unit on demand in dependence on the signals of said at least one sensor,
wherein the at least one actuating unit comprise electric motor, and
wherein the electric motor is of a two-part configuration with a first and a second component, and wherein the first component is activated by the primary control and regulating unit and the second component is activated by the at least one secondary control and regulating unit.

2. The power brake system as claimed in claim 1, wherein the primary control and regulating unit has a separate energy supply that is independent of the energy supply of the secondary control and regulating unit.

3. The power brake system as claimed in claim 1, wherein the primary control and regulating unit and the at least one secondary control and regulating unit are configured in compliance with a prescribed safety requirement, in such a way that the primary control and regulating unit and the at least one secondary control and regulating unit together meet the prescribed safety requirement, each of the control and regulating units in itself conforming to a low safety requirement.

4. The power brake system as claimed in claim 3, wherein the prescribed safety requirement is ASIL D and the low safety requirement is ASIL B.

5. The power brake system as claimed in claim 1, wherein the at least one actuating unit further comprises an actuator, which transforms a rotary movement of a motor spindle of the electric motor into a translatory movement of a primary piston of a tandem brake master cylinder, the tandem brake master cylinder having two chambers, each chamber being hydraulically connected to a respective brake circuit with each brake circuit having two wheel brakes.

6. The power brake system as claimed in claim 5, wherein the actuator comprises a gear mechanism and a spindle unit.

7. The power brake system as claimed in claim 1, further comprising another one of the at least one actuating unit, which can be activated by the at least one secondary control and regulating unit.

8. The power brake system as claimed in claim 7, wherein the at least one secondary control and regulating unit and the at least one actuating unit have together a separate energy supply that is independent of the energy supply of the primary control and regulating unit.

9. The power brake system as claimed in claim 1, further comprising a travel sensor of a redundant configuration and/or a pressure sensor of a redundant configuration.

10. The power brake system as claimed in claim 1, wherein the operating unit comprises a brake pedal and a simulator.

11. The power brake system as claimed in claim 1, wherein the electric motor is an electronically commutating BLDC motor.

\* \* \* \* \*